United States Patent
Kadokawa et al.

(10) Patent No.: US 12,542,246 B2
(45) Date of Patent: Feb. 3, 2026

(54) ELECTRODE FOIL FOR ELECTROLYTIC CAPACITOR HAVING IMPROVED RELIABILITY AND CAPACITY, ELECTROLYTIC CAPACITOR, AND METHOD FOR MANUFACTURING ELECTRODE FOIL FOR ELECTROLYTIC CAPACITOR

(71) Applicant: Panasonic Intellectual Property Management Co., Ltd., Osaka (JP)

(72) Inventors: Toshifumi Kadokawa, Hyogo Ken (JP); Mitsuhisa Yoshimura, Osaka Fu (JP); Masami Tsubaki, Kyoto Fu (JP); Shumpei Matsushita, Yamaguchi Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 118 days.

(21) Appl. No.: 18/292,224

(22) PCT Filed: Jul. 29, 2022

(86) PCT No.: PCT/JP2022/029292
§ 371 (c)(1),
(2) Date: Jan. 25, 2024

(87) PCT Pub. No.: WO2023/008558
PCT Pub. Date: Feb. 2, 2023

(65) Prior Publication Data
US 2024/0282533 A1    Aug. 22, 2024

(30) Foreign Application Priority Data
Jul. 30, 2021 (JP) .................. 2021-126279

(51) Int. Cl.
*H01G 9/048* (2006.01)
*H01G 9/00* (2006.01)
*H01G 9/042* (2006.01)

(52) U.S. Cl.
CPC .......... *H01G 9/048* (2013.01); *H01G 9/0029* (2013.01); *H01G 9/042* (2013.01)

(58) Field of Classification Search
None
See application file for complete search history.

(56) References Cited

U.S. PATENT DOCUMENTS

| 6,038,124 A | 3/2000 | Uchi et al. |
| 2006/0180474 A1* | 8/2006 | Fujimoto ............... H01G 9/045 205/213 |

(Continued)

FOREIGN PATENT DOCUMENTS

| JP | H06-204094 A | 7/1994 |
| JP | H10-189398 A | 7/1998 |

(Continued)

OTHER PUBLICATIONS

International Search Report dated Oct. 25, 2022 issued in International Patent Application No. PCT/JP2022/029292, with English translation.

*Primary Examiner* — Eric W Thomas
(74) *Attorney, Agent, or Firm* — Rimon P.C.

(57) ABSTRACT

An electrode foil for an electrolytic capacitor contains a valve metal, and includes a core portion, and a porous portion continuous with the core portion. The porous portion has a thickness T μm, and includes an inner layer region located on the core portion side, and a surface layer region located opposite to the core portion. The surface layer region is a region within a distance T/4 from an outer surface of the porous portion, and the inner layer region is a region within a distance T/4 from a boundary of the porous portion with (Continued)

the core portion. An average size $D_1$ nm of pores in the surface layer region is smaller than an average size $D_2$ nm of pores in the inner layer region.

19 Claims, 4 Drawing Sheets

(56) References Cited

U.S. PATENT DOCUMENTS

| | | | |
|---|---|---|---|
| 2008/0094775 A1* | 4/2008 | Sneh | H01G 9/055 |
| | | | 29/25.42 |
| 2011/0002088 A1* | 1/2011 | Aoyama | H01G 9/045 |
| | | | 29/25.03 |
| 2022/0148815 A1 | 5/2022 | Yoshimura et al. | |

FOREIGN PATENT DOCUMENTS

| | | |
|---|---|---|
| JP | H11-026320 A | 1/1999 |
| JP | 2003-109865 A | 4/2003 |
| WO | 2020/174751 A1 | 9/2020 |

* cited by examiner

ELECTRODE FOIL FOR ELECTROLYTIC CAPACITOR HAVING IMPROVED RELIABILITY AND CAPACITY, ELECTROLYTIC CAPACITOR, AND METHOD FOR MANUFACTURING ELECTRODE FOIL FOR ELECTROLYTIC CAPACITOR

This application is the U.S. National Phase under 35 U.S.C. § 371 of International Patent Application No. PCT/JP2022/029292, filed on Jul. 29, 2022, which in turn claims the benefit of Japanese Patent Application No. 2021-126279, filed on Jul. 30, 2021, the entire disclosures of which Applications are incorporated by reference herein.

TECHNICAL FIELD

The present disclosure relates to an electrode foil for an electrolytic capacitor, an electrolytic capacitor, and a method for manufacturing an electrode foil for an electrolytic capacitor.

BACKGROUND ART

An electrode foil of an electrolytic capacitor contains a valve metal, and includes a porous portion, and a core portion continuous with the porous portion. The porous portion provides an electrode foil having a larger surface area, thus increasing the capacity of the electrolytic capacitor.

PTL 1 proposes an electrode foil for an aluminum electrolytic capacitor characterized in that an aluminum foil whose surface area has been enlarged by etching is compressed in the thickness direction of the foil, thus providing an increased surface area per unit volume relative to the surface area before the compression.

CITATION LIST

Patent Literature

[PTL 1] JP H11-26320A

SUMMARY OF INVENTION

Technical Problem

Sufficient studies have not yet been carried out with regard to pores within an etched layer, and a need exists for a further improvement in the performance of electrolytic capacitors.

Solution to Problem

An aspect of the present disclosure relates to an electrode foil for an electrolytic capacitor, the electrode foil containing a valve metal, and including: a core portion; and a porous portion continuous with the core portion, wherein the porous portion has a thickness T μm, and includes an inner layer region located on the core portion side, and a surface layer region located opposite to the core portion, the surface layer region is a region within a distance T/4 from an outer surface of the porous portion, the inner layer region is a region within a distance T/4 from a boundary of the porous portion with the core portion, and an average size $D_1$ nm of pores in the surface layer region is smaller than an average size $D_2$ nm of pores in the inner layer region. Hereinafter, such an electrode foil is also referred to as an "electrode foil A".

Another aspect of the present disclosure relates to an electrode foil for an electrolytic capacitor, the electrode foil containing a valve metal, and including: a core portion; and a porous portion continuous with the core portion, wherein in a pore distribution of the porous portion as measured by mercury intrusion porosimetry, a cumulative pore volume $V^0$ cm$^3$/g at a pore size of 0.01 μm or more and 1 μm or less, and a cumulative pore volume $V_{S1}$ cm$^3$/g at a pore size of 0.01 μm or more and 0.06 μm or less satisfy the relationship: $V_{S1}/V_0 \le 0.07$. Hereinafter, such an electrode foil is also referred to as an "electrode foil B".

Still another aspect of the present disclosure relates to an electrolytic capacitor including a capacitor element, wherein the capacitor element includes a wound body and an electrolyte, the wound body is formed by winding an anode foil, a cathode foil, and a separator disposed between the anode foil and the cathode foil, and the anode foil includes the above-described electrode foil (an electrode foil A, an electrode foil B, or an electrode foil simultaneously satisfying the constitutions of the electrode foils A and B), and a dielectric layer covering a metal skeleton constituting the porous portion of the electrode foil.

Yet another aspect of the present disclosure relates to a method for manufacturing an electrode foil for an electrolytic capacitor, the method including: an etching step of etching a sheet containing a valve metal to form porous portions on both surfaces, respectively, of the sheet; and a compressing step of compressing the etched sheet in a thickness direction thereof, wherein after the compressing step, a thickness $T_A$ μm of the sheet and a thickness T μm of each of the porous portions satisfy the relationship: $90 \le T_A \le 200$, and $25 \le T \le (T_A/2)-10$.

Advantageous Effects of Invention

According to the present disclosure, it is possible to obtain an electrolytic capacitor having high reliability and large capacity.

While the novel features of the present disclosure are set forth in the appended claims, the present disclosure, both as to organization and content, will be better understood and appreciated, along with other objects and features thereof, from the following detailed description taken in conjunction with the drawings.

DESCRIPTION OF EMBODIMENTS

In the following, embodiments of the present disclosure will be described by way of examples. However, the present disclosure is not limited to the examples described below:

Although examples of specific numerical values and materials may be given in the following description, other numerical values and materials may be used as long as the effects of the present disclosure can be achieved. In the present specification, the expression "from a numerical value A to a numerical value B" includes the numerical value A and the numerical value B, and can be read as "a numerical value A or more and a numerical value B or less". In the case where lower limits and upper limits are given as examples for numerical values relating to specific physical properties or conditions in the following description, any of the given lower limits and any of the given upper limits can be freely combined unless the lower limit is greater than or equal to the upper limit. In the case where a plurality of materials are given as examples, one of the materials may be selected and used alone, or two or more of the materials may be used in a combination.

The present disclosure encompasses combinations of matters recited in two or more claims freely selected from a plurality of claims recited in the appended claims. That is, matters recited in two or more claims freely selected from a plurality of claims recited in the appended claims can be combined as long as there are no technical discrepancies.

(Electrode Foil for Electrolytic Capacitor)

An electrode foil for an electrolytic capacitor (electrode foil A) according to an embodiment of the present disclosure contains a valve metal, and includes a core portion, and a porous portion continuous with the core portion. The porous portion has a thickness T (μm), and includes an inner layer region located on the core portion side, and a surface layer region located opposite to the core portion. The surface layer region is a region within a distance T/4 from an outer surface of the porous portion. The inner layer region is a region within a distance T/4 from a boundary of the porous portion with the core portion. An average size $D_1$ (nm) of pores in the surface layer region is smaller than an average size $D_2$ (nm) of pores in the inner layer region. The average size of the pores is smaller on the outer surface side than on the core portion side of the porous portion. As used herein, where simply referred to as a "size", it refers to a "diameter". It is preferable that the constitutions of the electrode foil A and an electrode foil B described below are simultaneously satisfied.

The porous portion includes a large number of pores (pits). To increase the capacity, it is conceivable to increase the pit density or the thickness of the porous portion to increase the surface area of the foil. However, increasing the pit density or the thickness of the porous portion may result in a reduction in strength of the electrode foil, thus generating cracks in the electrode foil or causing breakage of the foil in the manufacturing process of the electrolytic capacitor. A reduction in strength of the electrode foil is due to a reduction in strength of the surface layer of the porous portion, and such a reduction in strength is especially noticeable when the pit density or the thickness of the porous portion is large.

Presumable causes of a reduction in strength of the surface layer of the porous portion include the following (a) to (c). (a) The surface layer is likely to be degraded by an etching liquid coming into contact with the surface of the metal foil during electrolytic etching. (b) Stress generated during winding of the electrode foil in the manufacturing process of the electrolytic capacitor is likely to be large on the surface layer of the electrode foil. (c) A rolled foil (aluminum raw foil) containing a valve metal used as a raw material of the electrode foil usually has rolling marks, and the rolling marks are likely to remain on the surface layer of the porous portion even after etching.

In this respect, in the electrode foil for an electrolytic capacitor according to the present disclosure, the average size of pores is smaller on the outer surface side of the porous portion than on the core portion side thereof. That is, in the porous portion, the average size $D_1$ of pores in the surface layer region is smaller than the average size $D_2$ of pores in the inner layer region. This makes it possible to improve the strength of the surface layer, thus suppressing a reduction in strength of the surface layer when the pit density or the thickness of the porous portion is increased. As a result, it is possible to increase the tensile strength of the electrode foil. With the electrode foil according to the present disclosure, it is possible to increase the capacity per unit volume. By using the electrode foil, it is possible to obtain a large-capacity electrolytic capacitor having excellent reliability. In addition, the electrolyte retention in the pores of the porous portion can be increased, whereby the contact between the dielectric layer and the electrolyte is enhanced.

From the viewpoint of capacitance enhancement, a ratio: $D_1/D_2$ of the $D_1$ to $D_2$ may be 0.5 or more, 0.55 or more, 0.6 or more, or 0.7 or more. From the viewpoint of suppressing the reduction in strength of the surface layer and increasing the capacity per unit volume, $D_1/D_2$ may be 0.98 or less, 0.95 or less, or 0.9 or less. The range of $D_1/D_2$ may be a combined range of an upper limit and a lower limit freely selected from the above-described upper and lower limits, but is preferably 0.5 or more and 0.98 or less, and more preferably 0.55 or more and 0.95 or less, from the viewpoint of suppressing the reduction in strength of the surface layer and enhancing the capacity per unit volume.

The above-described $D_1$ and $D_2$ can be determined in the following manner.

(i) A cross-sectional image of the electrode foil is obtained with a scanning electron microscope (SEM). Using the image, the thicknesses of ten arbitrarily selected points of the porous portion are measured, and the average value thereof is calculated as a thickness T of the porous portion.

(ii) A region within a distance T/4 from an outer surface (surface S in FIG. 1) of the porous portion is assumed to be a surface layer region.

(iii) A cross-sectional image of the surface layer region is obtained, and the image is binarized to distinguish between a metal skeleton region and a pore (pit) region other than the metal skeleton region that constitute the surface layer region.

(iv) A point within the pore region of the surface layer region is arbitrarily selected, a line segment passing through the point and crossing the pore region is depicted, and the length of the line segment where the length is the shortest is measured. This measurement is carried out for 20 arbitrarily selected points within the pore region of the surface layer region, and the average value of the resulting measured values is determined as an average size $D_1$ of the pores in the surface layer region.

(v) A region within a distance T/4 from a boundary (surface B in FIG. 1) of the porous portion with the core portion is assumed to be an inner layer region. An average size $D_2$ of the pores in the inner layer region is determined in the same manner as in (iii) and (iv) above.

From the viewpoint of suppressing the reduction in strength of the surface layer and improving the electrolyte retention within the pores, a porosity $P_1$ of the surface layer region may be smaller than a porosity $P_2$ of the inner layer region. From the viewpoint of capacitance increase, a ratio: $P_1/P_2$ of $P_1$ to $P_2$ may be 0.5 or more, 0.55 or more, 0.6 or more, or 0.7 or more. From the viewpoint of suppressing the reduction in strength of the surface layer and increasing the capacity per unit volume, $P_1/P_2$ may be 0.95 or less, 0.92 or less, or 0.85 or less. The range of $P_1/P_2$ may be a combined range of an upper limit and a lower limit freely selected from the above-described upper and lower limits, and may be, for example, 0.5 or more and 0.95 or less, or 0.55 or more and 0.92 or less.

Using the binarized cross-sectional image of the surface layer region in (iii) above, obtained in the process of determining $P_1$ above, the porosity $P_1$ of the surface layer region is obtained by measuring an area $S_0$ of the entire region of the image and an area $S_1$ of a region occupied by the pores in the image, and calculating $(S_1/S_0) \times 100$. The porosity $P_2$ of the inner layer region can be determined in the same manner as described above.

A surface roughness (roughness of the outer surface of the porous portion) Ra of the electrode foil is preferably 2.0 µm or less, more preferably 1.5 µm or less, and even more preferably 0.8 µm or less. The surface roughness Ra of the electrode foil can be reduced within the above-described range by a compressing step described below. Irregularities of the surface layer of the porous portion due to the rolling marks of the aluminum raw foil are present even after etching, and physically weak etched portions are likely to be formed in the vicinity of the rolling marks. However, by the setting surface roughness (roughness of the outer surface of the porous portion) Ra of the electrode foil to 2.0 µm or less, it is possible to inhibit formation of physically weak etched portions in the vicinity of the rolling marks. Note that the surface roughness Ra of the electrode foil means an arithmetic mean roughness, and the arithmetic mean roughness Ra can be determined in accordance with JIS B 0601:2001.

In the case where the surface roughness Ra of the electrode foil is reduced to 1.5 µm or less by a compressing step described below, the influence of the rolling marks can be sufficiently reduced. The surface roughness of the electrode foil can be smaller than the surface roughness based on the rolling marks of the raw foil, so that any unwanted oxide formed along the rolling marks can be removed. From the viewpoint of securement of a sufficient surface area of the electrode foil and ease of increasing the capacity, the surface roughness Ra of the electrode foil is preferably 0.1 µm or more, and more preferably 0.2 µm or more.

The thickness $T_A$ of the electrode foil may be 90 µm or more and 200 µm or less, or 120 µm or more and 200 µm or less. The thickness T of the porous portion may be 25 µm or more and 90 µm or less, or 35 µm or more and 80 µm or less. When the thickness $T_A$ of the electrode foil is within the above-described range, it is possible to increase the thickness T of the porous portion within the above-described range while securing a sufficient thickness of the core portion. The thickness of the core portion may be, for example, 20 µm or more, or 25 µm or more.

When the thickness of the electrode foil is large (e.g., a thickness of 90 µm or more (or a thickness of 120 µm or more)), the stress generated in the electrode foil (surface layer) during winding increases. Therefore, the effect of improving the strength of the surface layer (the effect of suppressing generation of cracks due to the stress) of the electrode foil according to the present disclosure can be remarkably achieved.

The valve metal includes, for example, aluminum (Al), tantalum (Ta), niobium (Nb), and the like. The electrode foil may contain a valve metal as an alloy or compound containing the valve metal. In the case of using the electrode foil as an anode foil, the dielectric layer may be formed so as to cover the metal skeleton constituting the porous portion. The dielectric layer is, for example, a layer containing an oxide of the valve metal.

Figure 1:
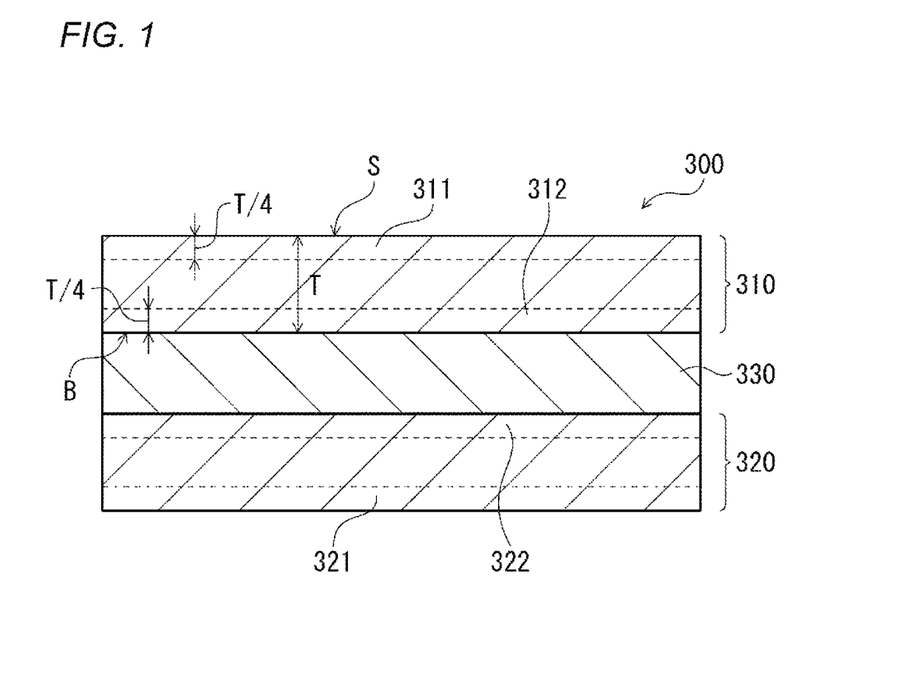
FIG. 1 is a cross-sectional view schematically showing an electrode foil for an electrolytic capacitor according to an embodiment of the present disclosure.

Here, FIG. 1 is a cross-sectional view schematically showing an electrode foil for an electrolytic capacitor according to an embodiment of the present disclosure. FIG. 1 shows a cross section of the electrode foil in a thickness direction thereof. Note that the electrode foil for an electrolytic capacitor according to the present disclosure is not limited thereto.

An electrode foil 300 includes a core portion 330, and porous portions 310 and 320 continuous with the core portion 330. The porous portion 310 and the porous portion 320 are formed so as to sandwich the core portion 330.

The porous portion 310 has a thickness T (µm), and includes an inner layer region 312 located on the core portion 330 side, and a surface layer region 311 located opposite to the core portion 330. The surface layer region 311 is a region within a distance T/4 from an outer surface S of the porous portion 310. The inner layer region 312 is a region within a distance T/4 from a boundary B of the porous portion 310 with the core portion 330. An average size $D_1$ (nm) of pores in the surface layer region 311 is smaller than an average size $D_2$ (nm) of pores in the inner layer region 312.

Similarly, the porous portion 320 also has a thickness T, and also includes a surface layer region 321 and an inner layer region 322. An average size $D_1$ of pores in the surface layer region 321 is smaller than an average size $D_2$ of pores in the inner layer region 322.

An electrode foil for an electrolytic capacitor (electrode foil B) according to another embodiment of the present disclosure contains a valve metal, and includes a core portion, and a porous portion continuous with the core portion, wherein in a pore distribution of the porous portion as measured by mercury intrusion porosimetry, the relationship: $V_{s1}/V_0 \leq 0.07$ is satisfied. Preferably, the electrode foil B further satisfies the relationship: $V_{s2}/V_0 \leq 0.05$ (or 0.04). Note that $V_0$ is a cumulative pore volume (cm$^3$/g) at a pore size of 0.01 µm or more and 1 µm or less. $V_{S1}$ is a cumulative pore volume (cm$^3$/g) at a pore size of 0.01 µm or more and 0.06 µm or less. $V_{S2}$ is a cumulative pore volume (cm$^3$/g) at a pore size of 0.01 µm or more and 0.05 µm or less. For the measurement of the pore distribution, AutoPore V series manufactured by Micromeritics can be used, for example.

Small pores having a pore size of 0.01 µm or more and 0.06 µm or less (or 0.05 µm or less) are likely to be closed by the dielectric layer, and therefore are disadvantageous in terms of capacity increase and ESR reduction, and also in terms of strength. Portions of the porous portion where pores are closed by the dielectric layer not only do not contribute to capacity enhancement, but also become hard and brittle. When the number of small pores increases to increase the number of the above-described closed portions, the strength of the electrode foil is reduced, thus generating cracks in the electrode foil, or causing breakage of the foil in the manufacturing process (transport of the electrode foil, slitting, take-up, connection to lead members by crimping, etc.) of the electrolytic capacitor. In contrast, when $V_{s1}/V_0$ (also $V_{S2}/V_0$) is within the above-described range, a smaller number of small pores are present, and a large number of pores having a pore size suitable for capacity enhancement are distributed, which makes it possible to increase the capacity. In this case, the number of the above-described closed portions is smaller, so that it is possible to suppress the reduction in strength. By using the electrode foil B, it is possible to obtain a large-capacity electrolytic capacitor having excellent reliability.

In a pore distribution of the porous portion as measured by mercury intrusion porosimetry, the electrode foil B preferably satisfies the relationship: $V_{L1}/V_0 \leq 0.4$, and more preferably also satisfies the relationship: $V_{L2}/V_0 \leq 0.1$ (or 0.08). Note that $V_{L1}$ is a cumulative pore volume (cm$^3$/g) at a pore size of 0.16 μm or more and 1 μm or less. $V_{L2}$ is a cumulative pore volume (cm$^3$/g) at a pore size of 0.5 μm or more and 1 μm or less.

Large pores having a pore size of 0.16 μm or more (or 0.5 μm or more) and 1 μm or less are unlikely to contribute to capacity enhancement. Large pores are disadvantageous in terms of surface area enlargement of the electrode foil. For example, when two large pores are formed at close positions, the pores collapse to each other, and the peripheral length (the total length of contours of inner wall surfaces of pores present per unit area of a cross section of the porous portion) of the pores is likely to be small, so that the pores are unlikely to contribute to capacity enhancement. When $V_{L1}/V_0$ (also $V_{L2}/V_0$) is within the above-described range, a smaller number of large pores are present, and a large number of pores having a pore size suitable for capacity enhancement are distributed, so that the surface area of the electrode foil is likely to be increased, and the capacity is likely to be increased.

(Method for Manufacturing Electrode Foil)

A method for manufacturing an electrode foil for an electrolytic capacitor according to an embodiment of the present disclosure includes, for example, an etching step of etching a sheet (metal foil) containing a valve metal to form porous portions on both surfaces, respectively, (or one surface) of the sheet, and a compressing step of compressing the etched sheet in a thickness direction thereof. In the etched sheet, the portion other than the porous portions remains as a core portion. The etched sheet includes the core portion, and the porous portions continuous with the core portion. The porous portions may be formed so as to sandwich the core portion.

By appropriately adjusting the degree of compression or the like in the compressing step, it is possible to produce an electrode foil that satisfies constitutions of the electrode foil A and/or the electrode foil B. That is, by adequately compressing the sheet in the compressing step, the average size of the pores can be smaller on the outer surface side of each of the porous portions than on the core portion side thereof. In the porous portions, the average size $D_1$ of the pores in the surface layer region can be smaller than the average size $D_2$ of the pores in the inner layer region. For example, it is possible to form a porous portion in which $D_1/D_2$ is 0.5 or more and 0.98 or less (or 0.55 or more and 0.95 or less). Note that the surface layer region is a region within a distance T/4 from the outer surface of the porous portion. The inner layer region is a region within a distance T/4 from the boundary of the porous portion with the core portion. T represents the thickness (μm) of the porous portion. By adequately compressing the sheet in the compressing step, it is possible to form a porous portion having a specific pore distribution in which the number of the above-described small pores (or the above-described small pores and large pores) is reduced.

In the manufacturing process of the electrolytic capacitor, the sheet comes into contact with a treating liquid (e.g., an etching liquid, a chemical formation solution) and rollers, as a result of which irregularities (or flaws) may be generated on the sheet. Stress may be concentrated on the irregularities in the manufacturing process, thus breaking the sheet (or generating cracks in the sheet). Also, the Al raw foil used for the sheet has rolling marks generated in the manufacturing process of the foil, and etching pits may be nonuniformly formed along the rolling marks, or in other words, along the length direction (rolling direction) of a band-shaped sheet. Owing to the effect of the rolling marks, the sheet may be broken (or cracks may be generated in the sheet). In this respect, adequately compressing the etched sheet as described above can reduce the effect of the above-described irregularities and the rolling marks to increase the strength of the surface layer sheet, thus suppressing the above-described breakage or the like of the sheet.

After the compressing step, the thickness $T_A$ of the sheet may be 90 μm or more and 200 μm or less, or 120 μm or more and 200 μm or less. After the compressing step, the thickness T of each of the porous portions may be 25 μm or more and $\{(T_A/2)-10\}$ μm or less. When the thickness T is within the above-described range, a sufficient thickness of the core portion can be secured. The thickness T may be 25 μm or more and 90 μm or less, or 35 μm or more and 80 μm or less. With a high-capacity foil, a porous portion having a large thickness T is provided, and a significant effect of increasing the surface layer strength by compression can be achieved. In particular, a high-capacity foil is used for a hybrid capacitor, and the thickness $T_A$ of the sheet (electrode foil) is preferably 90 μm or more, and the thickness T of the porous portion is preferably 25 μm or more.

(Etching Step)

In the etching step, a surface of the sheet containing the valve metal is etched to roughen the surface of the sheet, and to form porous portions continuous with the core portion. The etching may be electrolytic etching or chemical etching, or may be performed using a known method.

From the viewpoint of forming pores having a large size, electrolytic etching may be performed at a current density of 2.0 A/cm$^2$ or less, a current density of 1.5 A/cm$^2$ or less, or a current density of 1.2 A/cm$^2$ or less. The current density may be changed in the course of the etching. Pores having a large pore size are likely to form a dielectric layer having a large thickness, and therefore are advantageous in generating a higher voltage.

Electrolytic etching is preferably AC etching, but may be DC etching. In the case of AC etching, a porous portion including sponge-like pits having a relatively small size is likely to be formed. In the case of DC etching, a porous portion including tunnel-like pits having a relatively large size is likely to be formed.

When $T_E$ represents the etching time, the temperature of the etching liquid may be set to 10° C. or more and 60° C. or less for 0 to 0.7 $T_E$, and the temperature of the etching liquid may be set to 5° C. or more and 40° C. or less for 0.7 $T_E$ to $T_E$. In this case, variations in pit sizes in the thickness direction of the porous portion can be reduced. The etching time $T_E$ is 15 minutes or more and 30 minutes or less, for example.

(Compressing Step)

In the compressing step, the etched sheet may be transported between a pair of rollers, and compressed therebetween. The etched sheet that has been transported between the pair of rollers is compressed by the pressing force of the pair of rollers. By appropriately adjusting the roll pressing conditions in the manner described below, $D_1/D_2$ (also $P_1/P_2$) can be easily controlled within the above-described range. By appropriately adjusting the roll pressing conditions in the manner described below, $V_{S1}/V_0$ (also $V_{S2}/V_0$) and $V_{L1}/V_0$ (also $V_{L2}/V_0$) can be easily controlled in the above-described range.

The sheet may be compressed stepwise with a plurality of pairs of rollers disposed in a plurality of rows. In this case, the diameters of the pairs of rollers may be changed for each step, or may be reduced as the compression of the sheet proceeds. The compressing step may include a step of taking up, by a roller, the sheet that has been subjected to the sheet transporting step and the compression using the rollers. The strength of the surface layer of the sheet is increased by compression, so that breakage of the sheet when taking up the sheet using the roller is suppressed.

Figure 2:
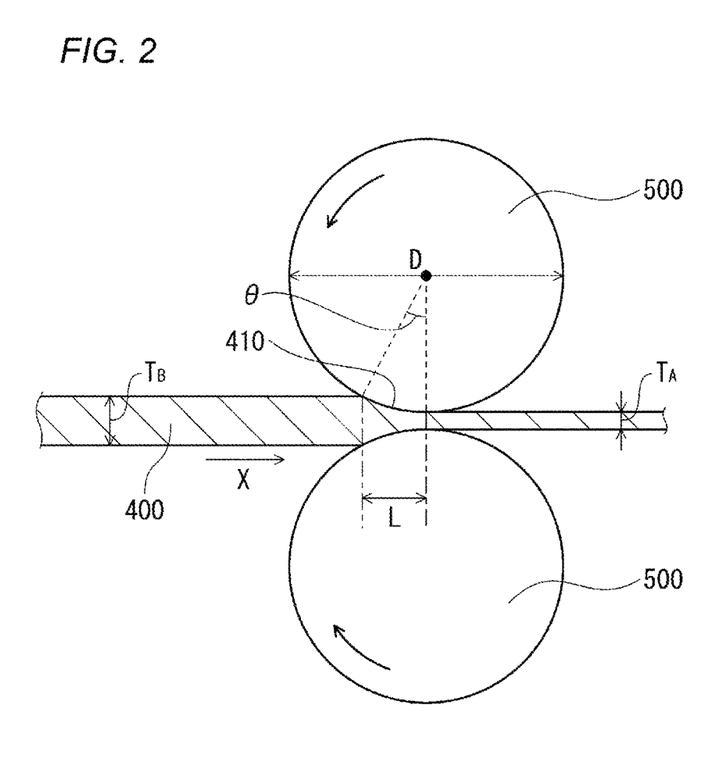
FIG. 2 is a diagram schematically showing an example of a compressing step of a method for manufacturing an electrode foil for an electrolytic capacitor according to an embodiment of the present disclosure.

Here, FIG. 2 is a configuration diagram showing an example of the compressing step. In the compressing step, a compression apparatus shown in FIG. 2 is used, for example. The compression apparatus includes a pair of rollers 500 that compress a sheet 400. The etched sheet 400 having a thickness $T_B$ (mm) is compressed into a thickness $T_A$ (mm) by the pressing force of the pair of rollers 500. The delivery rate of the sheet may be 0.5 m/min or more, or 0.5 m/min or more and 50 m/min or less.

From the viewpoint of ease of obtaining the above-described electrode foil, in the compressing step, the thickness of the sheet may be reduced by 5% or more and 40% or less. That is, when the thickness of the sheet is reduced from $T_B$ to $T_A$ by the compressing step, $\{(T_B-T_A)/T_B\} \times 100$ (hereinafter also referred to as a reduction rate) may be 5% or more and 40% or less. The reduction rate may be 10% or more and 30% or less, or 10% or more and 25% or less.

When each of the rollers 500 is viewed from a direction of the rotation axis thereof, a contact region 410 between the roller 500 and the sheet 400 has an arch shape, and a central angle θ of the roller 500 to the arc of the contact region 410 may be 0.15° or more and 1.5° or less.

When a projection region is assumed to be a region obtained by projecting the contact region 410 between the sheet 400 and the roller 500 to a virtual plane parallel to a principal surface of the sheet 400, a length L of the projection region in a transport direction X of the sheet 400 may be 0.5 mm or more and 5 mm or less.

The sheet 400 may be compressed with a linear pressure of 1 kN/cm or more and 14 kN/cm or less. A diameter D of each of the rollers 500 may be 75 mm or more and 1800 mm or less. The thickness $T_0$ (mm) of each of the porous portions of the sheet 400 before being compressed and the diameter D (mm) of each of the rollers 500 may satisfy the relationship: $380 \leq D/T_0 \leq 9800$.

The apparatus may further include a roller that transports the sheet 400, or a roller that takes up the compressed sheet 400. The apparatus may include a control unit configured to control the rotational speed of the rollers 500 and the like. The delivery rate of the sheet 400 may be controlled by the control unit.

The method for manufacturing the electrode foil may include a step of slitting the compressed sheet. In the slitting, a slitting apparatus, and a roller that takes up the slitted sheet are used. The strength of the surface layer of the sheet is increased by compression, so that breakage of the sheet when taking up the sheet using the roller is suppressed.

(Electrolytic Capacitor)

The electrode foil for an electrolytic capacitor according to an embodiment of the present disclosure can be suitably used for an electrolytic capacitor including a wound capacitor element. The wound capacitor element includes a wound body and an electrolyte. The wound body is formed by winding an anode foil, a cathode foil, and a separator disposed between the anode foil and the cathode foil. The anode foil includes the above-described electrode foil, and a dielectric layer covering a metal skeleton constituting the porous portion of the electrode foil.

For an electrolytic capacitor having a rated voltage of 20 V or more, for example, an Al foil that has been chemically converted with a chemical conversion voltage of 40 V or more is used as the anode foil. For such an anode foil, an electrode foil having a relatively large pit size is used to form a dielectric layer having a relatively large thickness (e.g., a thickness of 45 nm or more), so that the strength of the surface layer is likely to be reduced. Therefore, the effect of the electrode foil according to the present disclosure in improving the surface layer strength can be remarkably obtained. With a chemical conversion voltage of 40 V or more, the generated chemical conversion film has a large thickness. Therefore, using an electrode foil having a large pit size can inhibit the pits from being closed by the chemical conversion film having a large thickness, thus making it possible to efficiently increase the capacity.

(Anode Foil)

The anode foil includes the above-described electrode foil, and a dielectric layer covering a metal skeleton constituting the porous portion of the electrode foil. The dielectric layer is formed by forming an oxide film of the valve metal layer on a surface of the metal skeleton constituting the porous portion, for example, by anodization (chemical conversion). In the case of chemically converting the Al foil, the chemical conversion voltage may be 5 V or more, or 40 V or more, for example.

The thickness of the anode foil may be 60 μm or more and 200 μm or less, 90 μm or more and 200 μm or less, or 120 μm or more and 200 μm or less. The thickness of the dielectric layer is 45 nm or more, for example.

(Cathode Foil)

A metal foil containing a valve metal such as Al, Ta, or Nb can be used for the cathode foil. If necessary, the surface of the metal foil may be roughened by etching. That is, the cathode foil may be a metal foil including a porous portion, and a core portion continuous with the porous portion. The electrode foil for an electrolytic capacitor according to the present disclosure may be used for the cathode foil. The thickness of the cathode foil is 10 μm or more and 70 μm or less, for example.

(Separator)

The separator is not particularly limited, and a non-woven fabric or the like containing fibers of cellulose, polyethylene terephthalate, vinylon, or polyamide (e.g., aliphatic polyamide, or aromatic polyamide such as aramid) may be used, for example.

(Electrolyte)

The electrolyte covers at least a portion of the anode foil (dielectric layer), and is interposed between the anode foil (dielectric layer) and the cathode foil. The electrolyte includes at least either one of a solid electrolyte containing a conductive polymer, and a liquid electrolyte. The capacitor element may include a solid electrolyte, or may include a solid electrolyte and a liquid component (a liquid electrolyte or a non-aqueous solvent).

The dielectric layer is covered with the electrolyte, for example, by impregnating the anode foil (or wound body) with a treating liquid (or liquid component) containing a conductive polymer. Since $D_1$ is smaller than $D_2$ (also $P_1$ is smaller than $P_2$) in the above-described electrode foil, the treating liquid with which the porous portion has been impregnated is likely to be retained inside the pores, and the inner walls of the pores are likely to be covered with the electrolyte. Accordingly, the contact between the anode foil (dielectric layer) and the electrolyte is enhanced.

The solid electrolyte contains a conductive polymer. Examples of the conductive polymer include a π-conjugated polymer. The conductive polymer includes polypyrrole, polythiophene, polyfuran, polyaniline, and the like. The conductive polymer may be used alone or in any combination of two or more, or may be a copolymer of two or more monomers. The weight-average molecular weight of the conductive polymer is 1000 to 100000, for example.

In the present specification, polypyrrole, polythiophene, polyfuran, polyaniline, and the like mean polymers respectively including polypyrrole, polythiophene, polyfuran, polyaniline, and the like as basic skeletons. Therefore, polypyrrole, polythiophene, polyfuran, polyaniline, and the like may include derivatives thereof. For example, polythiophene includes poly(3,4-ethylenedioxythiophene) and the like.

The conductive polymer may be doped with a dopant. The solid electrolyte may contain a dopant together with the conductive polymer. The dopant includes polystyrene sulfonic acid and the like. If necessary, the solid electrolyte may further contain an additive.

The liquid component is in contact with the dielectric layer directly or with a conductive polymer interposed therebetween. The liquid component may be a non-aqueous solvent or a liquid electrolyte (electrolytic solution). The electrolytic solution contains a non-aqueous solvent, and an ionic substance (a solute (e.g., an organic salt)) dissolved therein. The non-aqueous solvent may be an organic solvent or an ionic liquid.

As the non-aqueous solvent, a solvent having a high boiling point is preferable. For example, it is possible to use a polyol compound such as ethylene glycol, a sulfone compound such as sulfolane, a lactone compound such as γ-butyrolactone, an ester compound such as methyl acetate, a carbonate compound such as propylene carbonate, an ether compound such as 1,4-dioxane, a ketone compound such as methyl ethyl ketone, and the like.

The liquid component may include an acid component (anion) and a base component (cation). A salt (solute) may be formed by the acid component and the base component. The acid component contributes to a film restoration function. The acid component includes an organic carboxylic acid, an inorganic acid, and the like. Examples of the inorganic acid include phosphoric acid, boric acid, sulfuric acid, and the like. Examples of the base component include primary to tertiary amine compounds and the like.

An organic salt is a salt in which at least one of the anion and the cation contains an organic material. For example, trimethylamine maleate, triethylamine borodisalicylate, ethyldimethylamine phthalate, mono 1,2,3,4-tetramethylimidazolinium phthalate, mono 1,3-dimethyl-2-ethylimidazolinium phthalate, and the like may be used as the organic salt.

From the viewpoint of suppressing dedoping of the dopant from the conductive polymer (degradation of the solid electrolyte), it is preferable that the acid component is contained in a larger amount than the base component in the liquid component. Also, in view of the fact that the acid component contributes to the film restoration function of the liquid component, it is preferable that the acid component is contained in a larger amount than the base component. The molar ratio: (acid component/base component) of the acid component to the base component is 1.1 or more, for example. From the viewpoint of, for example, suppressing dedoping of the dopant from the conductive polymer, the pH of the liquid component may be 6 or less, or 1 or more and 5 or less.

The above-described electrode foil may also be used for an electrolytic capacitor including a stacked capacitor element. In this case, the porous portion is formed in a partial region of the surface of the electrode foil. The stacked capacitor element includes an anode body, a solid electrolyte layer, and a cathode leading layer covering the solid electrolyte layer. The anode body includes the above-described electrode foil with the porous portion formed on a portion of the surface, and a dielectric layer covering a metal skeleton constituting the porous portion of the electrode foil. The solid electrolyte layer is formed so as to cover the dielectric layer. The cathode leading layer includes, for example, a silver paste layer and a carbon layer. An anode lead is connected to a region of the anode body that is not covered by the dielectric layer, and a cathode lead is connected to the cathode leading layer.

Figure 3:
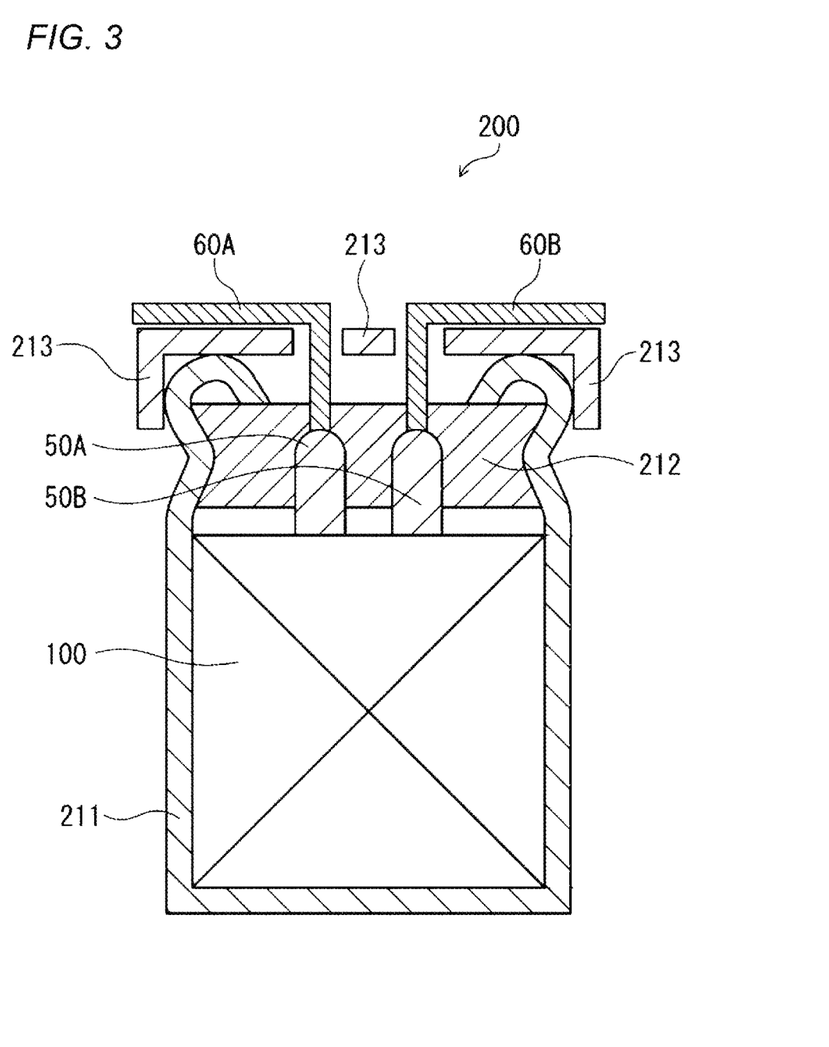
FIG. 3 is a cross-sectional view schematically showing an electrolytic capacitor according to an embodiment of the present disclosure.
Figure 4:
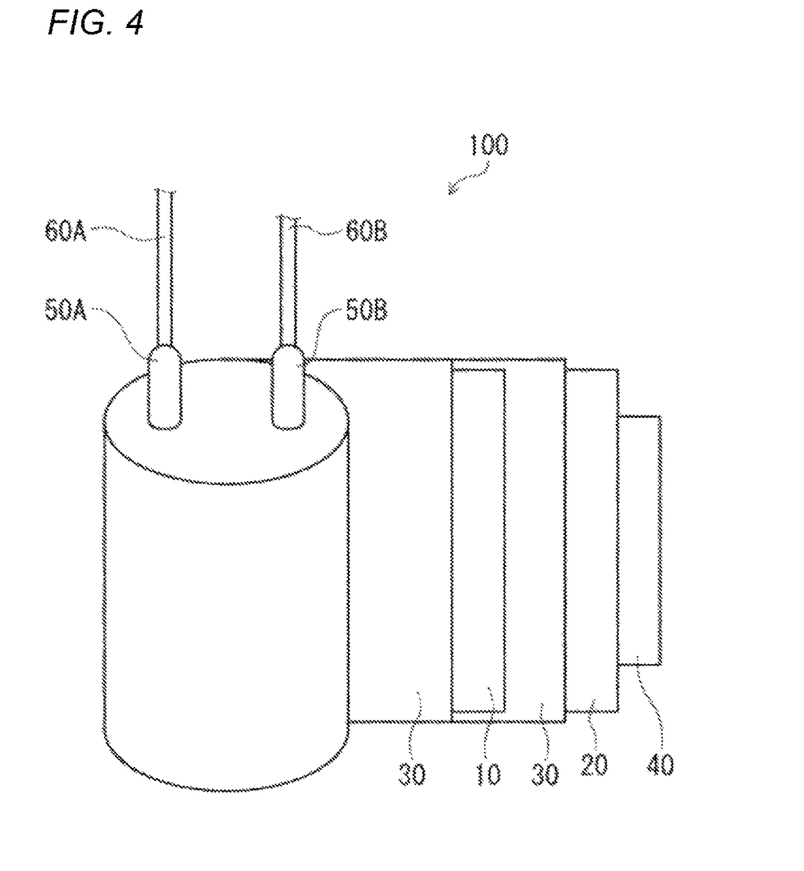
FIG. 4 is a perspective view schematically showing the configuration of a wound body shown in FIG. 3.

Here, FIG. 3 is a cross-sectional view schematically showing an electrolytic capacitor according to an embodiment of the present invention. FIG. 3 shows an example of the electrolytic capacitor including a wound capacitor element. FIG. 4 is a perspective view schematically showing the configuration of the wound body shown in FIG. 3.

An electrolytic capacitor 200 includes a capacitor element, and the capacitor element includes a wound body 100 and an electrolyte (not shown). The wound body 100 is formed by winding an anode foil 10 and a cathode foil 20 with a separator 30 interposed therebetween.

First end portions of lead tabs 50A and 50B are connected to the anode foil 10 and the cathode foil 20, respectively, and the wound body 100 is formed with the lead tabs 50A and 50B wound together therewith. Lead wires 60A and 60B are connected to second end portions of the lead tabs 50A and 50B, respectively.

A winding stop tape 40 is disposed on the outer surface of the cathode foil 20 located on the outermost layer of the wound body 100, and an end portion of the cathode foil 20 is fixed with the winding stop tape 40. In the case of preparing an anode foil 10 by cutting out the anode foil from a large foil, the wound body 100 may be further subjected to chemical conversion in order to provide the dielectric layer on a cut surface.

An electrolyte is interposed between the anode foil 10 (dielectric layer) and the cathode foil 20 of the wound body 100. The capacitor element can be formed, for example, by impregnating the wound body 100 with a treating liquid containing the electrolyte. The impregnation may be performed under reduced pressure, for example, in an atmosphere of 10 kPa to 100 kPa.

The wound body 100 is housed in a bottomed case 211 such that the lead wires 60A and 60B are located on the opening side of the bottomed case 211. As the material of the bottomed case 211, it is possible to use a metal such as aluminum, stainless steel, copper, iron, brass, and the like, or alloys thereof.

With a sealing member 212 disposed in an opening portion of the bottomed case 211 in which the wound body 100 is housed, an opening end of the bottomed case 211 is curled such that the end is crimped onto the sealing member 212, and a seat plate 213 is disposed on the curled portion, whereby the wound body 100 is sealed within the bottomed case 211.

The sealing member 212 is formed such that the lead wires 60A and 60B penetrate therethrough. The sealing member 212 may be any insulating substance, and an elastic body is preferable. In particular, an elastic body with high heat resistance such as silicone rubber, fluorine rubber, ethylene-propylene rubber, Hypalon rubber, butyl rubber, or isoprene rubber is preferable.

EXAMPLES

Hereinafter, the present disclosure will be described in detail by way of examples. However, the present disclosure is not limited to the examples.

Examples 1 to 5

(Etching Step)

A foil-shaped Al sheet (thickness $T_B$: 122 μm) was etched to form porous portions (thickness of each porous portion $T_0$: 48 μm) on both surfaces, respectively, of the Al sheet. In the etching, AC etching is performed, and the current density was appropriately adjusted within the range of 1.5 A/cm² or less.

(Compressing Step)

The etched Al sheet was compressed in the thickness direction thereof, thus obtaining electrode foils a1 to a5. In the compressing step, the thickness of the sheet was reduced at the ratios shown in Table 1 (Thickness reduction rate of Al sheet in Table 1). The sheet thickness $T_A$ (μm) and the thickness T (μm) of each of the porous portions were set to the values shown in Table 2.

As shown in FIG. 2, in the compressing step, the Al sheet was transported between a pair of rollers (diameter D: 75 mm), and compressed therebetween. The pressing force and the linear pressure of the rollers were set to the values shown in Table 1. The delivery rate of the Al sheet was set to the values shown in Table 1. The ratio: $D/T_0$ of the diameter D (mm) of each of the rollers to the thickness $T_0$ (mm) of each of the porous portions before compressing the sheet was 1562.5. The angle θ shown in FIG. 2 was set to the values shown in Table 1. The length L shown in FIG. 2 was set to the values shown in Table 1.

TABLE 1

| | Compressing step | | | | | |
|---|---|---|---|---|---|---|
| | Roller pressing force (kN) | Roller linear pressure (kN/cm) | Delivery rate of Al sheet (m/min) | Thickness reduction rate of Al sheet (%) | Angle θ in FIG. 2 (°) | Length L in FIG. 2 (mm) |
| Com. Ex. 1 | — | — | — | — | — | — |
| Ex. 1 | 5 | 0.7 | 20 | 11 | 0.8 | 0.5 |
| Ex. 2 | 6 | 0.9 | 15 | 13 | 1.1 | 0.7 |
| Ex. 3 | 8 | 1.1 | 10 | 18 | 1.2 | 0.8 |
| Ex. 4 | 12 | 1.7 | 10 | 25 | 1.3 | 0.9 |
| Ex. 5 | 20 | 2.9 | 5 | 32 | 1.5 | 1.1 |

The values of $D_1/D_2$ and $P_1/P_2$ determined by the method previously described were as shown in Table 2. The values of the arithmetic mean roughness Ra of the anode foil were as shown in Table 2. The values of $V_{S1}/V_0$, $V_{S2}/V_0$, $V_{L1}/V_0$, and $V_{L2}/V_0$ determined by the method previously described were as shown in Table 2.

TABLE 2

| | Electrode foil | | | Porous portion of electrode foil | | | | | | | |
|---|---|---|---|---|---|---|---|---|---|---|---|
| | Electrode foil No. | Thickness $T_A$ (μm) | Arithmetic mean roughness Ra of surface (μm) | Thickness T (μm) | $D_1/D_2$ | $P_1/P_2$ | $V_{S1}/V_0$ | $V_{S2}/V_0$ | $V_{L1}/V_0$ | $V_{L2}/V_0$ | Tensile strength (relative value) |
| Com. Ex. | b1 | 122 | 1.7 | 48 | 1.30 | 1.20 | 0.09 | 0.06 | 0.42 | 0.11 | 100 |
| Ex. 1 | a1 | 109 | 1.4 | 43 | 0.95 | 0.94 | 0.07 | 0.04 | 0.40 | 0.08 | 107 |
| Ex. 2 | a2 | 106 | 1.2 | 42 | 0.90 | 0.85 | 0.06 | 0.04 | 0.16 | 0.08 | 108 |
| Ex. 3 | a3 | 100 | 1.0 | 39 | 0.80 | 0.75 | 0.05 | 0.03 | 0.09 | 0.06 | 110 |
| Ex. 4 | a4 | 91 | 0.5 | 35 | 0.65 | 0.62 | 0.04 | 0.03 | 0.08 | 0.05 | 118 |
| Ex. 5 | a5 | 83 | 0.3 | 29 | 0.52 | 0.51 | 0.04 | 0.02 | 0.07 | 0.05 | 122 |

(Formation of Dielectric Layer)

Each of the electrode foils a1 to a5 was chemically converted to form a dielectric layer covering a metal skeleton constituting the porous portion. The chemical conversion was performed by immersing the electrode foil in an ammonium adipate solution for 45 minutes at 70° C., while applying a voltage of 65 V to the electrode foil. In this manner, anode foils A11 to A15 were produced. The electrode foils a1 to a5 correspond to Examples 1 to 5, and the anode foils A11 to A15 are chemically converted products of the electrode foils a1 to a5.

Comparative Example 1 b1 was produced in the same manner as with a1 except that the Al sheet was not compressed after being etched. B11 was produced in the same manner as with A11 except that b1 was used in place of a1.

Examples 6 to 10, Comparative Example 2

A21 to A25, and B21 were produced in the same manner as with A11 to A15, and B11, respectively, except that the chemical conversion voltage was set to 21 V.

Examples 11 to 15, Comparative Example 3

A31 to A35, and B31 were produced in the same manner with A11 to A15, and B11, respectively, except that the chemical conversion voltage was set to 5 V.

(Evaluation)

The capacitance of each of the anode foils was measured in accordance with "Test methods of electrode foil for aluminium electrolytic capacitors" (EIAJ RC-2364A) of Standard of Electronic Industries Association of Japan. The results of the measurement are shown in Tables 3 to 5. In Table 3, the capacitances are shown as relative values, with the capacitance of B11 taken as 100. In Table 4, the capacitances are shown as relative values, with the capacitance of B21 taken as 100. In Table 5, the capacitances are shown as relative values, with the capacitance of B31 taken as 100. Similarly, in Tables 3 to 5, the capacities per unit volume of the electrode foils are also shown as relative values.

TABLE 3

| Anode foil | Chemical conversion voltage (V) | Capacitance (relative value) | Capacity per unit volume (relative value) |
| --- | --- | --- | --- |
| B11 | 65 | 100 | 100 |
| A11 | 65 | 99 | 111 |
| A12 | 65 | 99 | 114 |
| A13 | 65 | 99 | 121 |
| A14 | 65 | 98 | 131 |
| A15 | 65 | 92 | 135 |

TABLE 4

| Anode foil | Chemical conversion voltage (V) | Capacitance (relative value) | Capacity per unit volume (relative value) |
| --- | --- | --- | --- |
| B21 | 21 | 100 | 100 |
| A21 | 21 | 99 | 111 |
| A22 | 21 | 99 | 114 |
| A23 | 21 | 98 | 120 |
| A24 | 21 | 96 | 128 |
| A25 | 21 | 92 | 135 |

TABLE 5

| Anode foil | Chemical conversion voltage (V) | Capacitance (relative value) | Capacity per unit volume (relative value) |
| --- | --- | --- | --- |
| B31 | 5 | 100 | 100 |
| A31 | 5 | 98 | 110 |
| A32 | 5 | 97 | 112 |
| A33 | 5 | 98 | 120 |
| A34 | 5 | 94 | 126 |
| A35 | 5 | 94 | 138 |

For all of A11 to A15, A21 to A25, and A31 to A35, it was confirmed that favorable capacities were achieved, and capacities per unit volume were high. For A11 to A14, A21 to A24, and A31 to A33, high capacities were secured.

For each of the electrode foils a1 to a5, and b1, a band-shaped sample (70 mm in length direction, 10 mm in width direction) was prepared, and the tensile strength of the sample in the length direction was measured in accordance with "Test methods of electrode foil for aluminium electrolytic capacitors" (EIAJ RC-2364A) of Standard of Electronic Industries Association of Japan. The results of the measurement are shown in Table 2. In Table 2, the tensile strengths are shown as relative values, with the tensile strength of b1 taken as 100. For a1 to a5, tensile strengths higher than that of b1 were achieved.

INDUSTRIAL APPLICABILITY

The electrode foil according to the present disclosure can be suitably used for an electrolytic capacitor required to have high reliability and high capacity.

Although the present disclosure has been described in terms of the presently preferred embodiments, it is to be understood that such disclosure is not to be interpreted as limiting. Various alterations and modifications will no doubt become apparent to those skilled in the art to which the present disclosure pertains, after having read the above disclosure. Accordingly, it is intended that the appended claims be interpreted as covering all alterations and modifications as fall within the true spirit and scope of the present disclosure.

REFERENCE SIGNS LIST

10: Anode foil
20): Cathode foil
30): Separator
40): Winding stop tape
50A. 50B: Lead tab
60A. 60B: Lead wire
100, 400: Wound body
200: Electrolytic capacitor
211: Bottomed case
212: Sealing member
213: Seat plate
300: Electrode foil
310, 320: Porous portion 311, 321: Surface layer region
312, 322: Inner layer region
330: Core portion
400: Sheet
410): Contact region
500: Roller

The invention claimed is:

1. An electrode foil for an electrolytic capacitor, the electrode foil containing a valve metal, and
comprising: a core portion; and a porous portion continuous with the core portion,
wherein the porous portion has a thickness T μm, and includes an inner layer region located on the core portion side, and a surface layer region located opposite to the core portion,
the surface layer region is a region within a distance T/4 from an outer surface of the porous portion,
the inner layer region is a region within a distance T/4 from a boundary of the porous portion with the core portion, and
an average size $D_1$ nm of pores in the surface layer region is smaller than an average size $D_2$ nm of pores in the inner layer region.

2. The electrode foil for an electrolytic capacitor according to claim 1,
wherein a ratio: $D_1/D_2$ of the $D_1$ to the $D_2$ is 0.5 or more and 0.98 or less.

3. The electrode foil for an electrolytic capacitor according to claim 1,
wherein a porosity $P_1$ of the surface layer region is smaller than a porosity $P_2$ of the inner layer region.

4. The electrode foil for an electrolytic capacitor according to claim 3,
wherein a ratio: $P_1/P_2$ of the $P_1$ to the P is 0.5 or more and 0.95 or less.

5. The electrode foil for an electrolytic capacitor according to claim 1,
wherein a surface roughness Ra of the electrode foil is 2.0 μm or less.

6. The electrode foil for an electrolytic capacitor according to claim 1,
wherein a thickness $T_A$ of the electrode foil is 90 μm or more and 200 μm or less.

7. The electrode foil for an electrolytic capacitor according to claim 1,
wherein the thickness T of the porous portion is 25 μm or more and 90 μm or less.

8. An electrolytic capacitor comprising
a capacitor element,
wherein the capacitor element includes a wound body and an electrolyte,
the wound body is formed by winding an anode foil, a cathode foil, and a separator disposed between the anode foil and the cathode foil, and
the anode foil includes the electrode foil according to claim 1, and a dielectric layer covering a metal skeleton constituting the porous portion of the electrode foil.

9. The electrolytic capacitor according to claim 8,
wherein the dielectric layer has a thickness of 45 nm or more.

10. The electrolytic capacitor according to claim 8,
wherein the capacitor element includes a solid electrolyte as the electrolyte, or includes the solid electrolyte and a liquid component, and
the solid electrolyte contains a conductive polymer.

11. An electrode foil for an electrolytic capacitor, the electrode foil containing a valve metal, and
comprising: a core portion; and a porous portion continuous with the core portion,
wherein in a pore distribution of the porous portion as measured by mercury intrusion porosimetry,
a cumulative pore volume $V_0$ cm³/g at a pore size of 0.01 μm or more and 1 μm or less, and
a cumulative pore volume $V_{S1}$ cm³/g at a pore size of 0.01 μm or more and 0.06 μm or less satisfy the relationship:
$V_{S1}/V_0 \leq 0.07$.

12. The electrode foil for an electrolytic capacitor according to claim 11,
wherein in the pore distribution of the porous portion,
the cumulative pore volume $V_0$ cm³/g, and
a cumulative pore volume $V_{L1}$ cm³/g at a pore size of 0.16 μm or more and 1 μm or less satisfy the relationship:
$V_{L1}/V_0 \leq 0.4$.

13. The electrode foil for an electrolytic capacitor according to claim 11,
wherein a thickness $T_A$ of the electrode foil is 90 μm or more and 200 μm or less.

14. The electrode foil for an electrolytic capacitor according to claim 11,
wherein the thickness T of the porous portion is 25 μm or more and 90 μm or less.

15. An electrolytic capacitor comprising
a capacitor element,
wherein the capacitor element includes a wound body and an electrolyte,
the wound body is formed by winding an anode foil, a cathode foil, and a separator disposed between the anode foil and the cathode foil, and
the anode foil includes the electrode foil according to claim 11, and a dielectric layer covering a metal skeleton constituting the porous portion of the electrode foil.

16. A method for manufacturing an electrode foil for an electrolytic capacitor, the method comprising:
an etching step of etching a sheet containing a valve metal to form porous portions on both surfaces, respectively, of the sheet; and
a compressing step of compressing the etched sheet in a thickness direction thereof,
wherein after the compressing step, a thickness $T_A$ μm of the sheet and a thickness T μm of each of the porous portions satisfy the relationship:
$90 \leq T_A \leq 200$, and $25 \leq T \leq (T_A/2)-10$,
wherein in the compressing step, the sheet is transported between a pair of rollers, and compressed therebetween,
when each of the rollers is viewed in a direction of a rotation axis thereof, a contact region between the roller and the sheet has an arch shape, and
a central angle θ of the roller to the arc of the contact region is 0.15° or more and 1.5° or less.

17. A method for manufacturing an electrode foil for an electrolytic capacitor, the method comprising:
an etching step of etching a sheet containing a valve metal to form porous portions on both surfaces, respectively, of the sheet; and a compressing step of compressing the etched sheet in a thickness direction thereof, wherein after the compressing step, a thickness $T_A$ μm of the sheet and a thickness $T$ μm of each of the porous portions satisfy the relationship:

$90 \leq T_A \leq 200$, and $25 \leq T \leq (T_A/2)-10$, wherein in the compressing step, the sheet is transported between a pair of rollers, and compressed therebetween, and when a projection region is assumed to be a region obtained by projecting a contact region between the sheet and each of the rollers to a virtual plane parallel to a principal surface of the sheet, a length L of the projection region in a transport direction of the sheet is 0.5 mm or more and 5 mm or less.

18. A method for manufacturing an electrode foil for an electrolytic capacitor, the method comprising:

an etching step of etching a sheet containing a valve metal to form porous portions on both surfaces, respectively, of the sheet; and a compressing step of compressing the etched sheet in a thickness direction thereof, wherein after the compressing step, a thickness $T_A$ μm of the sheet and a thickness $T$ μm of each of the porous portions satisfy the relationship:

$90 \leq T_A \leq 200$, and $25 \leq T \leq (T_A/2)-10$, wherein in the compressing step, the sheet is transported between a pair of rollers, and compressed therebetween, with a linear pressure of 1 kN/cm or more and 14 kN/cm or less.

19. A method for manufacturing an electrode foil for an electrolytic capacitor, the method comprising:

an etching step of etching a sheet containing a valve metal to form porous portions on both surfaces, respectively, of the sheet; and a compressing step of compressing the etched sheet in a thickness direction thereof, wherein after the compressing step, a thickness $T_A$ μm of the sheet and a thickness $T$ μm of each of the porous portions satisfy the relationship:

$90 \leq T_A \leq 200$, and $25 \leq T \leq (T_A/2)-10$, wherein in the compressing step, the sheet is transported between a pair of rollers, and compressed therebetween, and a thickness T mm of each of the porous portions before compressing the sheet, and a diameter D mm of each of the rollers satisfy the relationship: $380 \leq D/T_0 \leq 9800$.

* * * * *